(12) United States Patent
Kostrun et al.

(10) Patent No.: US 10,634,380 B2
(45) Date of Patent: Apr. 28, 2020

(54) SYSTEM FOR MONITORING OCCUPANCY AND ACTIVITY IN A SPACE

(71) Applicants: Marijan Kostrun, Rowley, MA (US); Anant Aggarwal, Waltham, MA (US); Richard C. Garner, Arlington, MA (US)

(72) Inventors: Marijan Kostrun, Rowley, MA (US); Anant Aggarwal, Waltham, MA (US); Richard C. Garner, Arlington, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 94 days.

(21) Appl. No.: 15/949,434

(22) Filed: Apr. 10, 2018

(65) Prior Publication Data

US 2019/0309974 A1 Oct. 10, 2019

(51) Int. Cl.
*F24F 11/46* (2018.01)
*G06K 9/00* (2006.01)
(Continued)

(52) U.S. Cl.
CPC .............. *F24F 11/46* (2018.01); *F24F 11/58* (2018.01); *F24F 11/64* (2018.01); *F24F 11/65* (2018.01);
(Continued)

(58) Field of Classification Search
CPC .. F24F 11/46; F24F 11/58; F24F 11/64; F24F 11/65; F24F 2120/14; F24F 2120/12;
(Continued)

(56) References Cited

U.S. PATENT DOCUMENTS 5,703,367 A * 12/1997 Hashimoto ........ G06K 9/00369
250/342
9,534,958 B1 1/2017 Lhamon et al.
(Continued)

FOREIGN PATENT DOCUMENTS

EP 3 196 614 A2 7/2017
WO 2017060083 A1 4/2017

OTHER PUBLICATIONS

Anonymous, "Omron Electronic Components Usage of D6T-44L/D6T-8L Thermal Sensor", Retrieved from internet at web.archive.org on May 27, 2019, 18 pages.
(Continued)

*Primary Examiner* — Christopher E. Everett
(74) *Attorney, Agent, or Firm* — Yutian Ling (57) ABSTRACT

Disclosed herein are embodiments of an occupancy monitoring system. The occupancy monitoring system includes a thermal sensor configured to monitor a gate (e.g., entry way) to a space. The thermal sensor includes a pixel array that generates a pixel value for each pixel in the pixel array, and the pixel value corresponds to a quantity of heat or thermal information detected by a pixel. The occupancy monitoring system acquires pixel values for the pixels of the pixel array. The occupancy monitoring system determines whether there is a change in occupancy of the space based on changes to a first region (or first pixel cluster) of the pixel array and a second region (or second pixel cluster) of the pixel array over time. The occupancy monitoring system may adjust lighting, temperature, and/or security systems for the space as the occupancy changes.

19 Claims, 8 Drawing Sheets

(51) Int. Cl.
*H04N 5/33* (2006.01)
*G05B 13/02* (2006.01)
*F24F 11/58* (2018.01)
*F24F 11/65* (2018.01)
*G01J 5/00* (2006.01)
*F24F 11/64* (2018.01)
*F24F 120/12* (2018.01)
*F24F 120/14* (2018.01)
*F24F 130/30* (2018.01)

(52) U.S. Cl.
CPC ........ *G01J 5/0025* (2013.01); *G05B 13/0265* (2013.01); *G06K 9/00369* (2013.01); *G06K 9/00771* (2013.01); *H04N 5/33* (2013.01); *F24F 2120/12* (2018.01); *F24F 2120/14* (2018.01); *F24F 2130/30* (2018.01); *F24F 2221/02* (2013.01)

(58) Field of Classification Search
CPC .. F24F 2221/02; F24F 2130/30; G01J 5/0025; G06K 9/00771; G06K 9/00369; G05B 13/0265; H04N 5/33
See application file for complete search history.

(56) References Cited

U.S. PATENT DOCUMENTS

| | | | | |
|---|---|---|---|---|
| 2005/0001154 | A1* | 1/2005 | Sumitomo | G06M 1/101 250/221 |
| 2006/0242186 | A1* | 10/2006 | Hurley | G01J 5/0022 |
| 2008/0277486 | A1* | 11/2008 | Seem | H04L 67/125 236/49.3 |
| 2010/0289643 | A1* | 11/2010 | Trundle | G08C 19/16 340/545.1 |
| 2010/0299116 | A1* | 11/2010 | Tomastik | G06K 9/00771 703/2 |
| 2011/0205366 | A1* | 8/2011 | Enohara | F24F 11/30 348/159 |
| 2013/0284931 | A1* | 10/2013 | Nagahisa | G01J 5/02 250/349 |
| 2014/0277757 | A1* | 9/2014 | Wang | G05D 23/1927 700/276 |
| 2015/0130933 | A1* | 5/2015 | Breuer | H04N 5/33 348/143 |
| 2015/0204556 | A1* | 7/2015 | Kusukame | B60H 1/00742 165/237 |
| 2016/0116343 | A1* | 4/2016 | Dixon | G01J 1/44 250/342 |
| 2016/0120007 | A1* | 4/2016 | Rein | H05B 37/0227 315/158 |
| 2016/0138976 | A1* | 5/2016 | Schilz | G08B 13/193 250/338.1 |
| 2016/0202678 | A1* | 7/2016 | Aggarwal | G05B 15/02 700/275 |
| 2016/0338177 | A1* | 11/2016 | Kikuchi | H05B 37/0227 |
| 2017/0264766 | A1* | 9/2017 | Okamoto | G06F 1/3231 |
| 2017/0364817 | A1* | 12/2017 | Raykov | G06N 20/00 |
| 2018/0217292 | A1* | 8/2018 | Grosse-Puppendahl | G01J 5/0025 |

OTHER PUBLICATIONS

Karwe, Markus, International Search Report and Written Opinion of the International Searching Authority, for counterpart application PCT/US2019/026713, dated Jun. 14, 2019, European Patent Office, Rijswijk, The Netherlands, 13 pages.

* cited by examiner

SYSTEM FOR MONITORING OCCUPANCY AND ACTIVITY IN A SPACE

TECHNICAL FIELD

The present disclosure generally relates to the field of methods and devices for activity monitoring in spaces. In particular, the present disclosure is directed to methods and devices for activity monitoring in spaces utilizing an infrared array.

BACKGROUND

Knowledge regarding the occupancy of a particular region or space can be useful in a variety of applications. For instance, knowledge of occupancy within a building can be used to improve the energy efficiency by the automation of lightning and heating, ventilation and/or air conditioning (HVAC), and can be used in emergency situations to improve search and rescue efforts of first responders by providing information regarding the location of occupants.

Passive infrared (PIR) motion sensors are often used for occupancy sensing. For example, PIR sensors are often used in combination with wall switches to turn on the lights in a room when a person enters, and turn the lights off at a fixed preset time duration after motion in the room is no longer detected. This type of system, however, can result in the lights in a room automatically turning off after a predetermined period of time after motion is last sensed, even if one or more people are still in the room.

BRIEF DESCRIPTION OF THE DRAWINGS

Reference should be made to the following detailed description which should be read in conjunction with the following figures, in which like numerals represent like parts.

DETAILED DESCRIPTION

Consistent with the present disclosure are embodiments of a system that includes an occupancy monitoring system. In some embodiments, the method further includes The occupancy monitoring system may include a thermal sensor configured to monitor a gate (e.g., entry way) to a space. The thermal sensor includes a pixel array that generates a pixel value for each pixel in the pixel array, and the pixel value corresponds to a quantity of heat or thermal information detected by a pixel. The occupancy monitoring system acquires pixel values from the thermal sensor for the pixels of the pixel array. The occupancy monitoring system determines whether an occupant enters or exits the space by comparing a first region (or first pixel cluster) of the pixel array to a second region (or second pixel cluster) of the pixel array. As occupants enter or exit the space, the occupancy monitoring system can be used as or by an environment controller to adjust lighting, temperature, and/or security systems for the space As used herein, the term occupancy refers to whether one or more people are within a space and may refer to the number of people within a space. In some implementations of the disclosed occupancy monitoring system, determining occupancy may be binary (e.g., occupied or not occupied). In some implementations of the disclosed occupancy monitoring system, determining occupancy includes determining the number of occupants in a space and may include determining a level of activity of the occupants (e.g., sitting, moving, dancing, etc.).

Figure 1:
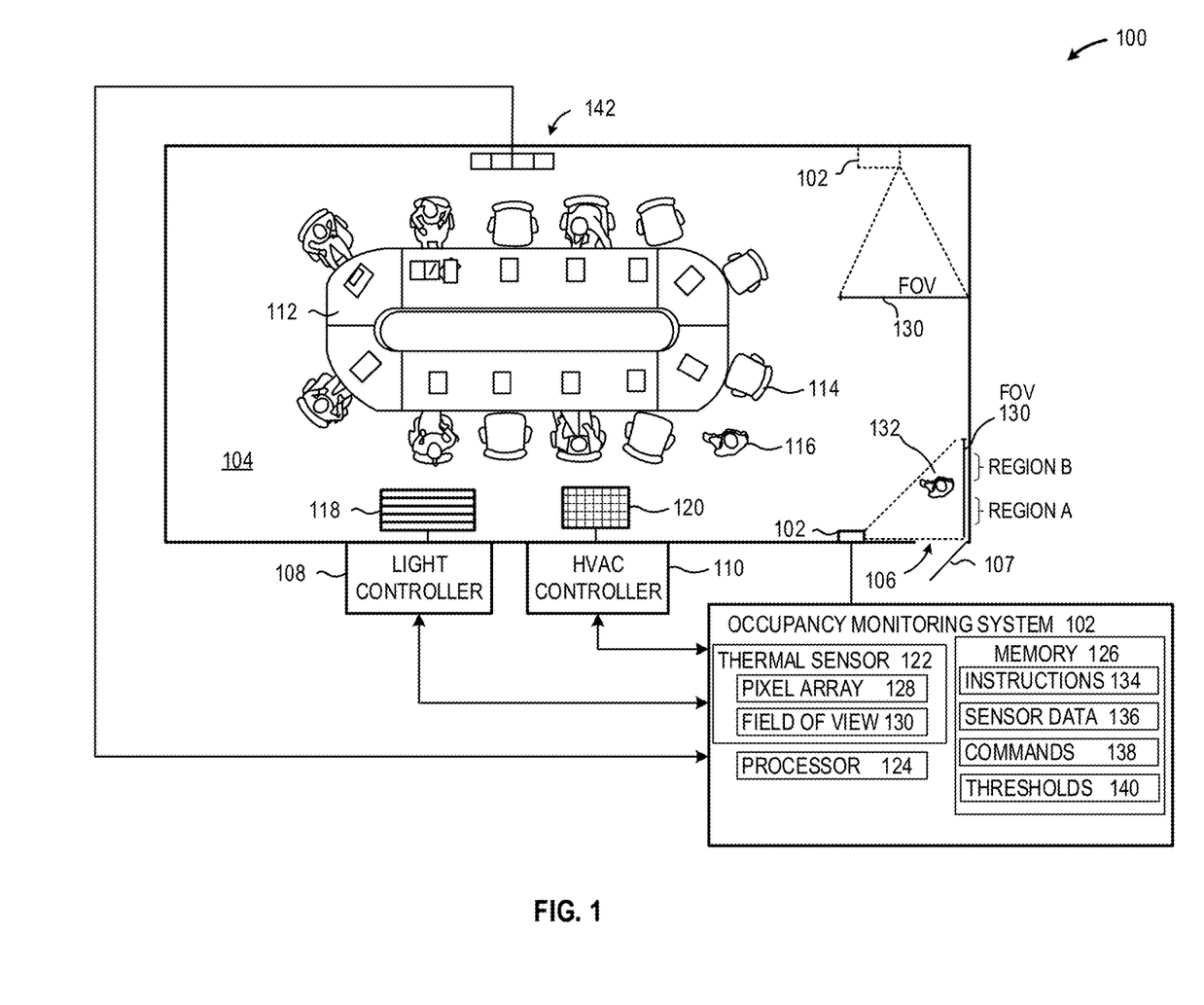
FIG. 1 is a block diagram of one exemplary embodiment of a system in accordance with the present disclosure.

FIG. 1 is a simplified block diagram of an example embodiment of a system 100 consistent with the present disclosure. The system 100 includes an occupancy monitoring system 102 configured to monitor and condition a space 104, according to one embodiment. The occupancy monitoring system 102 monitors a gate 106 to the space 104 to determine occupancy of the space 104 and to determine an activity level of occupants in the space 104, according to one embodiment. Based on the occupancy and level of activity of the space 104, the occupancy monitoring system 102 may operate as an environment controller and send one or more commands to one or more environment conditioning controllers, such as a light controller 108 and a heating, ventilation, and air conditioning ("HVAC") controller 110, according to one embodiment.

The space 104 may be a conference room, cubicle area, a dance studio, a living room, or one or more other commercial and/or residential spaces that are light and/or temperature controlled. The space 104 may be any space in which occupants enter and leave through one or more gates. As used herein, the term gate refers to any opening or portal to a space and refers both to openings or portals that may be closed by an element such as a door, window, or other element as well as openings or portals that are not closed by a structure, or are only partially closed by a structure (e.g., an airport metal detector). In the illustrated example, the space 104 includes a table 112, a number of chairs 114, and a number of occupants 116 (e.g., people), according to one embodiment. The space 104 may include one or more lights 118 and one or more HVAC vents 120 to enable the occupancy monitoring system 102 to condition the space 104, according to one embodiment.

The occupancy monitoring system 102 includes a number of components to facilitate monitoring and conditioning the space 104, according to one embodiment. The occupancy monitoring system 102 includes a thermal sensor 122, a processor 124, and memory 126, for monitoring and conditioning the space 104, according to one embodiment. The processor 124 and the memory 126 may be integrated into one or more microcontrollers, or may be discrete components.

The thermal sensor 122 monitors the gate 106 (e.g., adjacent to a door 107) and enables the occupancy monitoring system 102 to determine and track occupancy within the space 104, according to one embodiment. The thermal sensor 122 may be an infrared image sensor or camera, which is configured to detect heat or thermal information from an environment, according to one embodiment. The thermal sensor 122 includes a pixel array 128 and a field of view 130, according to one embodiment. The thermal sensor 122 determines occupancy by acquiring thermal information through the pixel array 128, according to one embodiment. The thermal information (e.g., thermal flux) within various portions of the pixel array 128 may be analyzed to indicate when one or more of the occupants 116 enter or exit the space 104, according to one embodiment. The pixels within the pixel array 128 provide pixel values that are representative of the amount of heat sensed by the thermal sensor 122 within the field of view 130 of the thermal sensor 122, according to one embodiment. The field of view 130 represents a physical space from which the pixel array 128 may receive or detect heat, thermal activity, or thermal information.

As a simplified illustrative example, when an occupant 132 enters the space 104 through the gate 106, region A of the pixel array 128 (shown in FIG. 2) will detect an increased level of thermal information (e.g., thermal flux) as the occupant 132 enters the field of view 130. As the occupant 132 continues to traverse the field of view 130, region A of the pixel array 128 will discontinue detecting the occupant 132 and region B of the pixel array 128 will detect an increased level of thermal information. The occupancy monitoring system 102 may be configured to interpret the thermal information received by the pixel array 128 to determine if the occupant 132 moved from region A to region B (e.g., entered the space 104) or moved from region B to region A (e.g., exited the space). The occupancy monitoring system 102 may convert the thermal information into sensor data that may be used to control one or more of the lights 118 and the HVAC vents 120, according to one embodiment.

The occupancy monitoring system 102 uses the processor 124 to execute instructions 134 that are stored in the memory 126, according to one embodiment. The processor 124 may be configured to execute the instructions 134 to acquire and/or analyze sensor data 136 that is generated by the thermal sensor 122 and/or by the pixel array 128, according to one embodiment. In response to the acquisition and analysis of the sensor data 136, the processor 124 may be configured to execute instructions 134 to determine and store a number of occupants 116 entering the space 104, exiting the space, and/or remaining in the space 104. The processor 124 may be configured to execute instructions 134 that transmit commands 138 to the light controller 108 and/or to the HVAC controller 110 to turn on the lights 118, to turn off the lights 118, to dim the lights 118, to undim the lights 118, to increase the temperature of air passing through the HVAC vents 120, to decrease the temperature of the air exiting the HVAC vents 120, to increase the flow of air exiting the HVAC vents 120, to decrease the flow of air exiting the HVAC vents 120, and/or to maintain the temperature and flow of air exiting the HVAC vents 120, according to various embodiments.

The processor 124 may execute the instructions 134 and may issue one or more of the commands 138 in response to the sensor data 136 exceeding one or more thresholds 140, according to one embodiment. Thresholds may be applied to a variety of calculations for the pixels values including, but not limited to, a thermal flux value, a thermal flux velocity value, a centroid value, a centroid velocity value, or the like, according to various embodiments. The one or more thresholds 140 may be set to a predetermined level above a default level. For example, if the average pixel value of region A of the pixel array 128 has a default value of 10 across 40 pixels, then an increase of 10% or 20% (e.g., 1 or 2) may be a likely indicator of an occupant standing within the view of region A of the pixel array 128.

In addition to using sensor data 136 from the thermal sensor 122, the occupancy monitoring system 102 may determine occupancy and activity level in the space 104 using sensor data 136 that is acquired from one or more passive infrared ("PIR") sensors 142, according to one embodiment. The PIR sensors 142 may indicate a level of activity by the occupants 116 within the space 104, according to one embodiment. The occupancy monitoring system 102 may transmit commands 138 to the light controller 108 and/or to the HVAC controller 110, at least partially based on a level of activity of the occupants 116 within the space 104, according to one embodiment. As an illustrative example, if the occupants 116 are relatively sedentary within the space 104, the occupancy monitoring system 102 may detect limited activity from the PIR sensors 142, and may maintain the lights 118 in an on state and may cause the temperature of the air exiting the vents 120 to be relatively warm (e.g., 72 degrees Fahrenheit). However, if the sensor data 136 indicates that the PIR sensors 142 are detecting high levels of activity in the space 104 (e.g., the occupants 116 are dancing, hopping, jumping, or otherwise moving around actively), the occupancy monitoring system 102 may maintain the lights 118 in an on state but may cause the temperature of the air exiting the vents 120 to decrease (e.g., to 64 degrees) to cool the space 104 and keep the occupants 116 relatively comfortable.

In addition to the light controller 108 and the HVAC controller 110, the occupancy monitoring system 102 may transmit commands to other environment controllers. For example, based on the occupancy and level of activity in the space 104, the occupancy monitoring system 102 may be configured to lock the door 107, open/close shutters to a window, turn on/off an alarm system, turn on/off screens and/or projectors, and the like.

Figure 2:
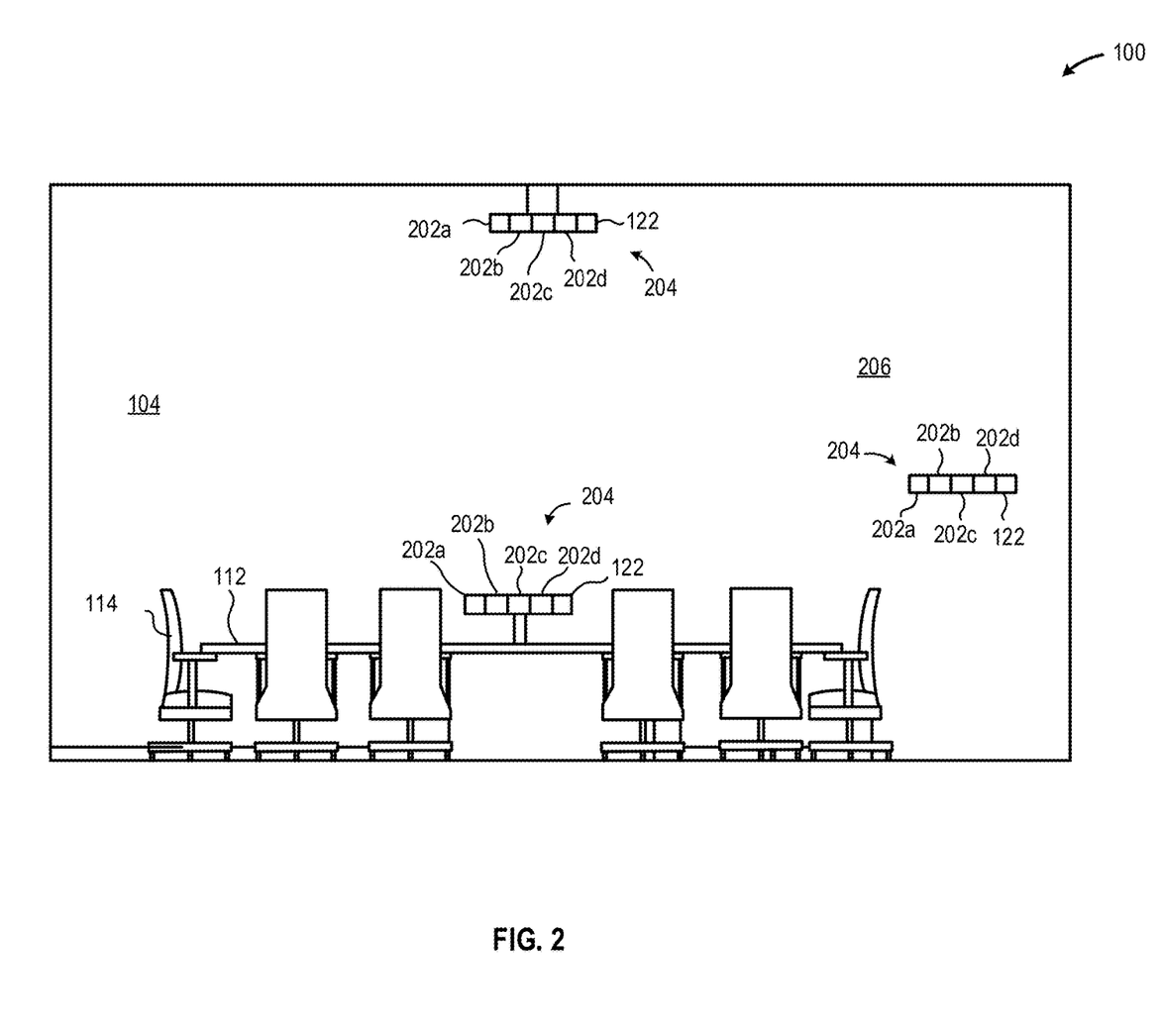
FIG. 2 is a block diagram of a partial side view of the system of FIG. 1 in accordance with the present disclosure.

FIG. 2 is a partial side view of the system 100 consistent with the present disclosure. In one embodiment, the thermal sensor 122 is coupled to a number of PIR sensors 202 (individually, 202a, 202b, 202c, 202d) to form a sensor array 204, according to one embodiment. Although the sensor array 204 is illustrated to include four PIR sensors 202 in FIG. 2, in general each sensory array 204 may include any number of PIR sensors 202. The sensor array 204 may be located on the ceiling of the space 104, according to one embodiment. The sensor array 204 may be located on the table 112, according to one embodiment. The sensor array 204 may be located on a wall 206 that is facing the gate 106 (shown in FIG. 1), according to one embodiment. In each of the configurations, the thermal sensor 122 is configured, adjusted, or positioned to receive thermal information from a field of view that is directed towards the gate 106 (shown in FIG. 1). The number of PIR sensors 202 are directed towards different areas of the space 104 (e.g., left, right, up, down) to detect when and/or how frequently occupants within the space 104 move, to enable the occupancy monitoring system 102 to condition the space 104 at least partially based on an activity level of the occupants, according to one embodiment.

Figure 3:
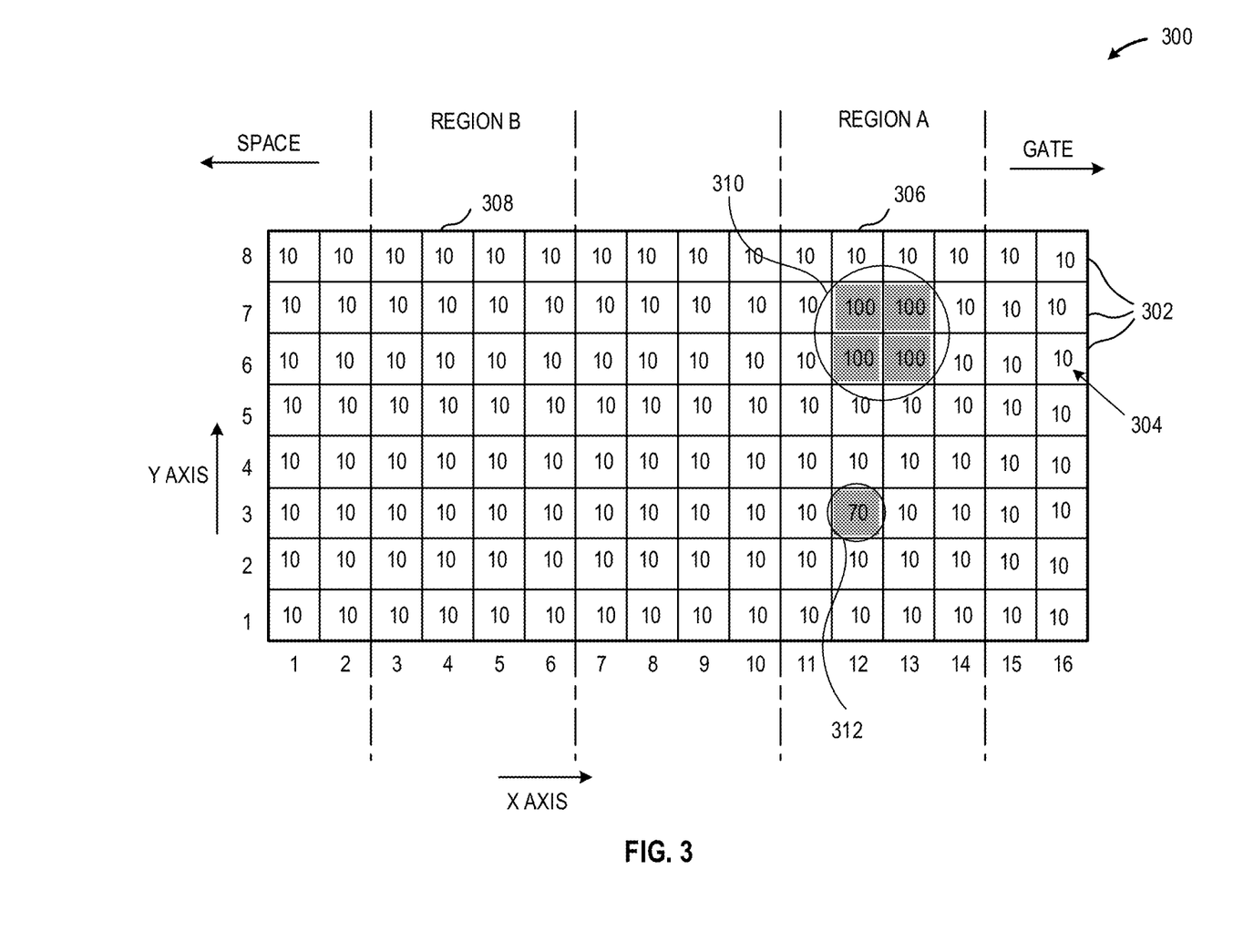
FIG. 3 is an example diagram of a pixel array in accordance with the present disclosure.

FIG. 3 is an example diagram of a pixel array 300 that may represent the pixel array 128 (shown in FIG. 1), consistent with the present disclosure. The pixel array 300 includes a plurality of pixels 302 (each represented by a square), according to one embodiment. The pixel array 300 is illustrated as having an x axis and a y axis. For example, the pixel array 300 includes 16 pixels along the x-axis and 8 pixels along the y-axis. A 16×8 pixel array is merely one example of many possible examples of pixel array configurations available for the pixel array 300. Other examples may include, but are not limited to, 4×8 pixel array, 4×16 pixel array, 8×8 pixel array, and 32×32 pixel array, among others. Typically, more pixels correspond with higher cost and less pixels correspond with lower cost. In one embodiment, the pixel array 300 includes enough pixels to detect thermal changes in 2 or 3 regions, while having a small enough quantity of pixels to be difficult (due to pixilation) to personally identify occupants entering the space (e.g., less than 1000 pixels), according to one embodiment. For example, while image sensors (e.g., CMOS image sensors) having millions of pixels may be cost-effectively purchased or manufactured, thermal sensors (e.g., a thermal imaging sensor) may be limited to tens, hundreds, or thousands of pixels to acquire thermal information within reasonable costs (e.g., less than $10 per sensor).

Each of the plurality of pixels 302 includes its own pixel value 304. The pixel value 304 of a pixel is an integer that may range from 0 to 255 (e.g., for an 8 bit readout). The pixel value 304 represents an intensity of the thermal information detected by a pixel. A higher value (e.g., 180) represents larger thermal flux (e.g., more heat) and a lower value represents the detection of smaller thermal flux (e.g., less heat). Therefore, an occupant's face positioned next to the pixel array 300 may register a relatively high pixel value 304 (e.g., 190), an ice cube may register a relatively low pixel value 304 (e.g., 2), and a fire may saturate the value of the pixel and register a maximum pixel value of 255, as an example.

The pixel array 300 may be analyzed for occupancy detection by using 2 or more regions, according to one embodiment. For example, the pixel array 300 may be divided into 2 regions that include a region A and a region B. The region A may correspond to a first pixel cluster 306 and the region B may correspond to a second pixel cluster 308, according to one embodiment. The first pixel cluster 3062 may be defined, for example, as pixels 11-14 along the x axis and pixels 1-8 along the y axis of the pixel array 300, according to one embodiment. The second pixel cluster 308 may be defined, for example, as pixels 3-6 along the x axis and pixels 1-8 along the y axis of the pixel array 300, according to one embodiment. Other groups or clusters of pixels may be used to define two or more additional or alternative pixel clusters, according to various embodiments.

The pixel array 300 depicts example thermal information that is representative of an occupant being detected in region A while no occupant is being detected in region B, according to one embodiment. For example, within the first pixel cluster 306, the pixel array 300 may include a sub-cluster 310 and a sub-cluster 312, when an occupant has moved to the middle of region A, according to one embodiment. The sub-cluster 310 may include, for example, four pixels that are defined by pixels 12-13 along the x axis and pixels 6-7 along the y axis. The sub-cluster 310 may represent a thermal response of the pixel array 300 to an occupant's head as they enter or pass through a gate (e.g., a door). In ambient air, the pixels 302 of the pixel array 300 may have a pixel value of, for example, 10. The example pixel values in the sub-cluster 310 are 100, which are significantly higher than the example ambient air pixel values of 10. The sub-cluster 312 may include a pixel located at pixel 12 along the x axis and pixel 3 along the y axis and may represent a thermal response of the pixel array 300 of an occupant's hand while the occupant is positioned near the middle of region A. An occupant's hand may emit less heat than a head of an occupant and may generate a lower thermal response in a thermal sensor than an occupant's head. As result, the sub-cluster 312 may register a lower pixel value, e.g., 70, upon detection of a hand or other appendage of an occupant. By contrast, the second pixel cluster 308 of region B includes pixels having pixel values that represent an example of a thermal response of the pixel array 300 that is not detecting an occupant or other heat source.

Various techniques can be used to analyze the pixel values of the pixel array 300 to detect and/or determine occupancy of the space as occupants pass through the gate. For example, a sum, average, or other mathematical calculation can be applied to the pixel values of the first pixel cluster 306 and to the second pixel cluster 308 to establish baseline values. Once the sum, average, or other mathematical calculation increases by 5 percent, 10 percent, 20 percent, or some other predetermined threshold, it may be determined that an occupant has been detected in the cluster that exceeds the threshold, according to one embodiment. In one embodiment, the occupancy monitoring system 102 (shown in FIG. 1) may be configured to increment an occupant counter if the occupancy monitoring system 102 determines that an occupant was detected in region A followed by an occupant being detected in region B. In one embodiment, the occupancy monitoring system 102 may be configured to decrement an occupant counter if the occupancy monitoring system 102 determines that an occupant was detected in region B followed by an occupant being detected in region A.

More specific calculations or representations of the pixel values include a thermal flux, a thermal flux velocity, a centroid, and a centroid velocity. In other words, the raw pixel values may be manipulated into one or more other formats or representations to facilitate machine learning and/or occupant detection. One or more of the thermal flux, thermal flux velocity, centroid, and centroid velocity may be calculated for each pixel cluster 306 and 308. Thermal flux $M\_\{k\}$ may be calculated as:

$$M\_\{k\}=\text{sum}(p\_\{i,j\}), \quad \text{Equation (1)}$$

in which k is a discrete time step, $p\_\{i,j\}$ represents the pixels in a cluster or in the array, and i and j are x and y indices of the pixel array 300.

Thermal flux velocity $dM\_\{k\}$ may be calculated as:

$$dM\_\{k\}=M\_\{k\}-M\_\{k-1\}, \quad \text{Equation (2)}$$

in which k is a discrete time step and k−1 is a previous time step (e.g., 100 ms prior).

A centroid C may be calculated as:

$$C\{k\}=\text{sum}(i*j*p\{i,j\})/M\{k\}. \quad \text{Equation (3)}$$

A centroid velocity dC may be calculated as:

$$dC\{k\}=C\{k\}-C\{k-1\}. \quad \text{Equation (4)}$$

Figure 4A:
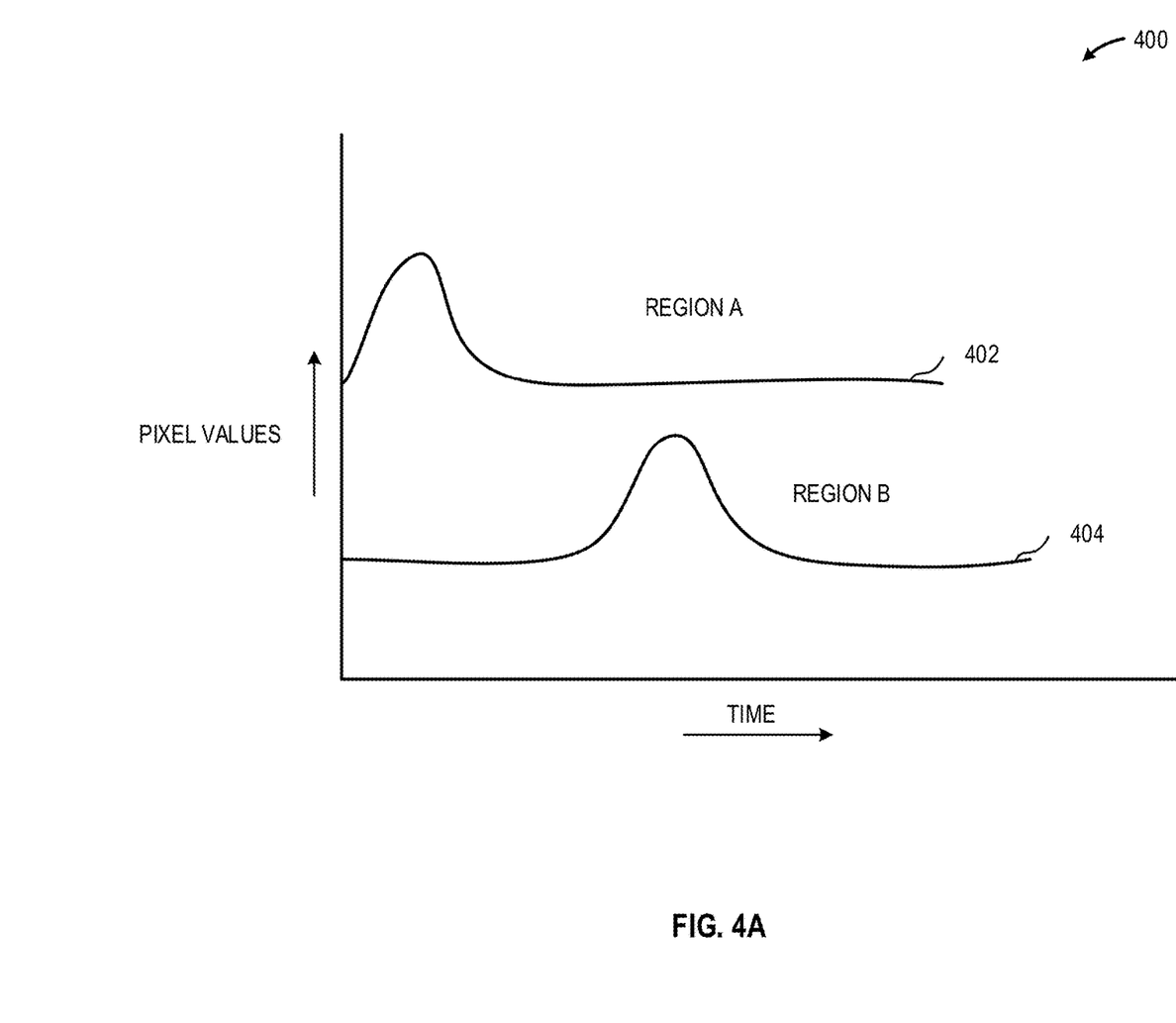
FIGS. 4A and 4B are example graphs of pixel values, with respect to time, for regions of a pixel array of a thermal sensor in accordance with the present disclosure.
Figure 4B:
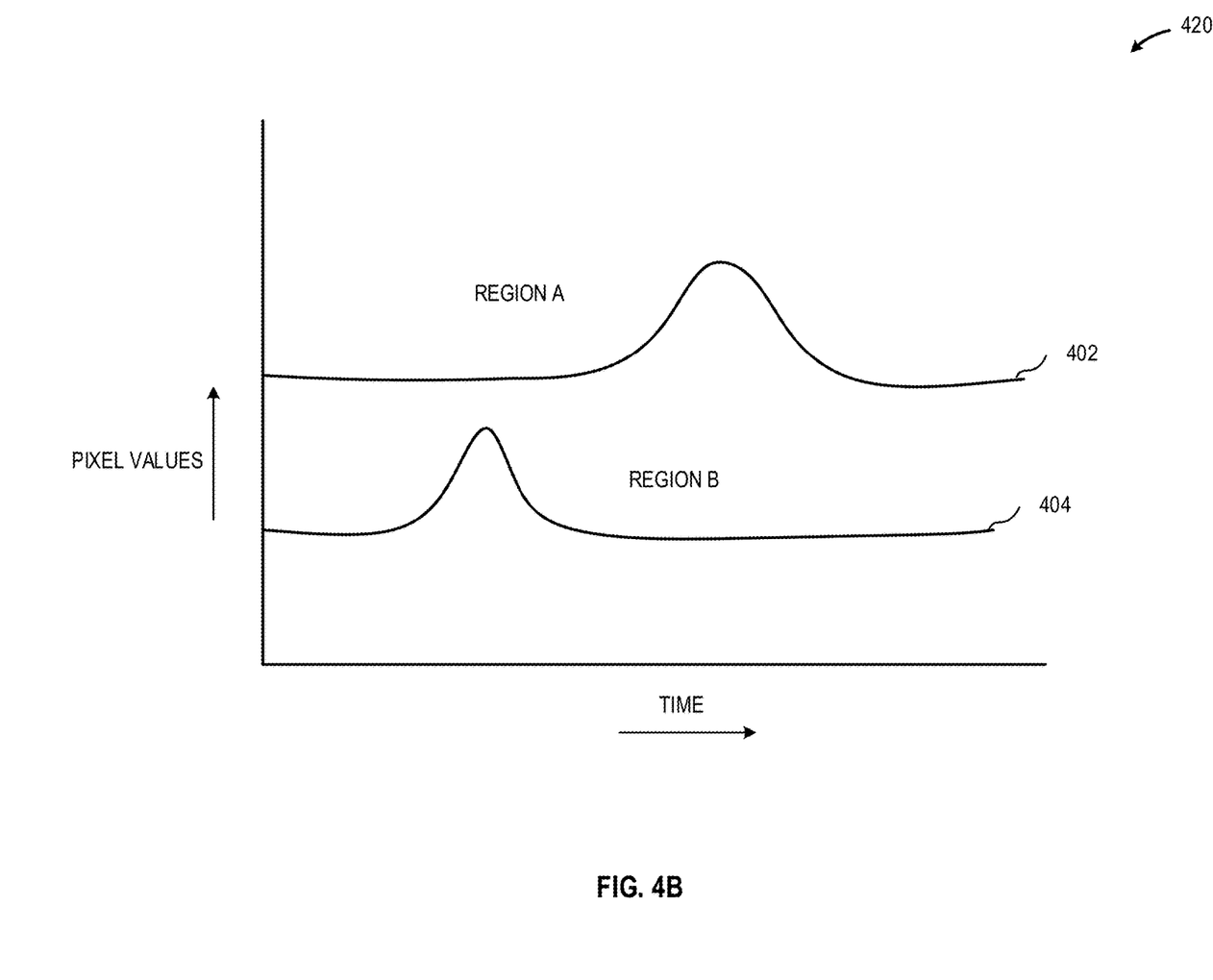

FIGS. 4A and 4B are illustrative graphs of pixel values, with respect to time, for region A and region B (shown in FIG. 3) consistent with the present disclosure. FIG. 4A illustrates a pixel graph 400 that includes a first plot 402 that represents changes in pixel values of the first pixel cluster 306 (shown in FIG. 3) and includes a second plot 404 that represents changes in pixel values of the second pixel cluster 308 (shown in FIG. 3), according to one embodiment. The first plot 402 gradually increases and decreases in value as thermal information is detected in response to an occupant entering and exiting region A, according to one embodiment. The second plot 404 gradually increases and decreases in value as thermal information is detected in response to an occupant entering and exiting region B, according to one embodiment. The pixel values can be represented by a sum, an average, a centroid calculation, or by some other mathematical calculation applied to the pixel values of the first pixel cluster 306 and/or the second pixel cluster 308 (shown in FIG. 3), according to one embodiment. In one embodiment, an increase in pixel values in region A followed by an increase in pixel values in region B is interpreted as an indication of an occupant entering the space by passing through the gate.

FIG. 4B illustrates a pixel graph 420 that includes the first plot 402 and the second plot 404. In one embodiment, an increase in pixel values in region B followed by an increase in pixel values in region A is interpreted as an indication of an occupant exiting the space by passing through the gate.

Figure 5:
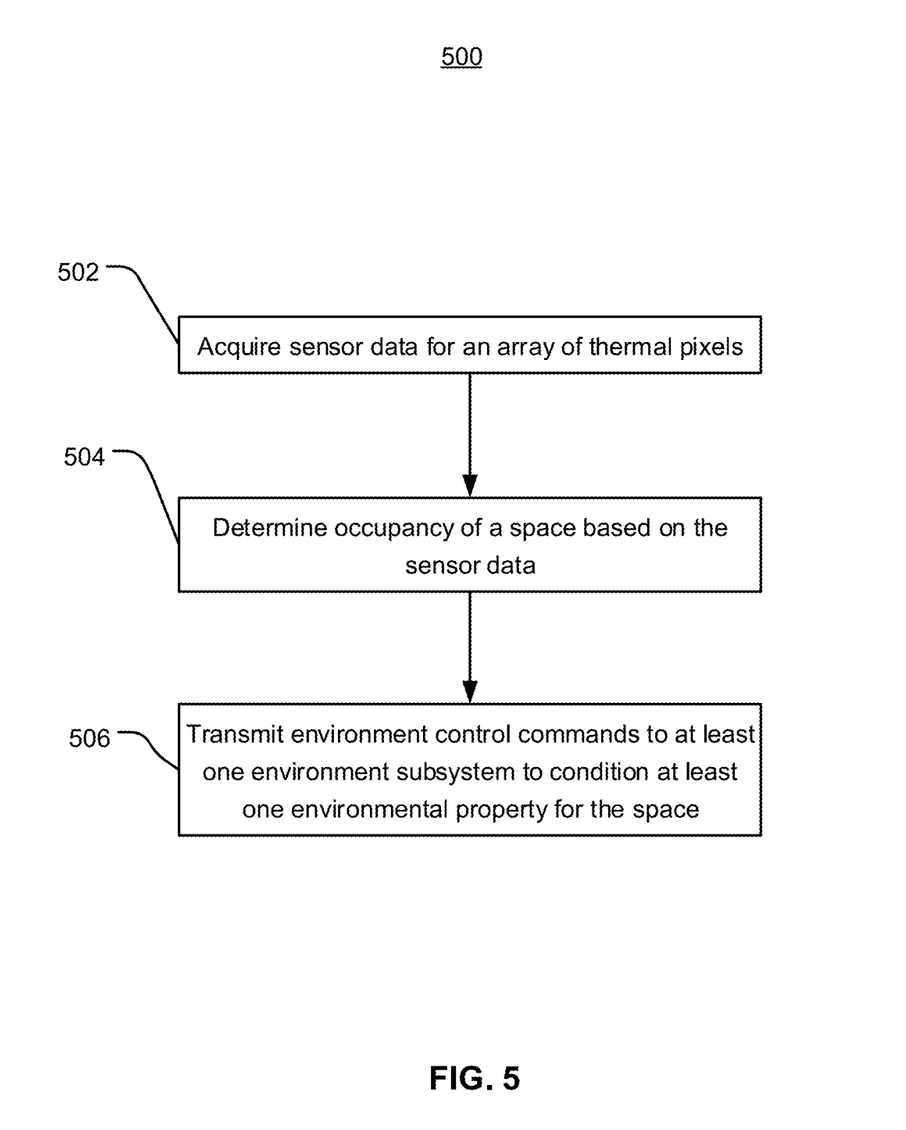
FIG. 5 is a flowchart illustrating a method of occupancy monitoring in accordance with the present disclosure.

FIG. 5 is a flow chart illustrating a method 500 for occupancy monitoring in accordance with the present disclosure. The illustrated flow chart may be shown and described as including a particular sequence of operations. It is to be understood, however, that the sequence of operations merely provides an example of how the general functionality described herein can be implemented. The operations do not have to be executed in the order presented unless otherwise indicated. The method 500 may be performed by the occupancy monitoring system 102 in FIG. 1.

At operation 502, the method 500 includes acquiring sensor data for an array of thermal pixels, according to one embodiment. For example, the occupancy monitoring system 102 may include one or more thermal sensors 122 that detect changes in thermal levels near a gate of a space.

At operation 504, the method 500 includes determining occupancy of a space based on the sensor data, according to one embodiment. Determining occupancy may include counting occupants entering and exiting a space, storing the number of occupants in the space, and monitoring a level of activity in the space (e.g., with one or more PIR sensors). The occupancy monitoring system may use the sensor from the array of thermal pixels to determine, at least in part, the occupancy of the space.

At operation 506, the method 500 includes transmitting environment control commands to at least one environment subsystem to condition at least one environmental property for the space, according to one embodiment. Environmental properties include, but are not limited to, access (e.g., locking a door), lighting (e.g., opening blinds, turning lights on/off, etc.), and temperature (e.g., increase, decrease, maintain, etc.). The environmental control commands may be based on the determined occupancy of the space (e.g., how many occupants are in the space and their average activity level).

Figure 6:
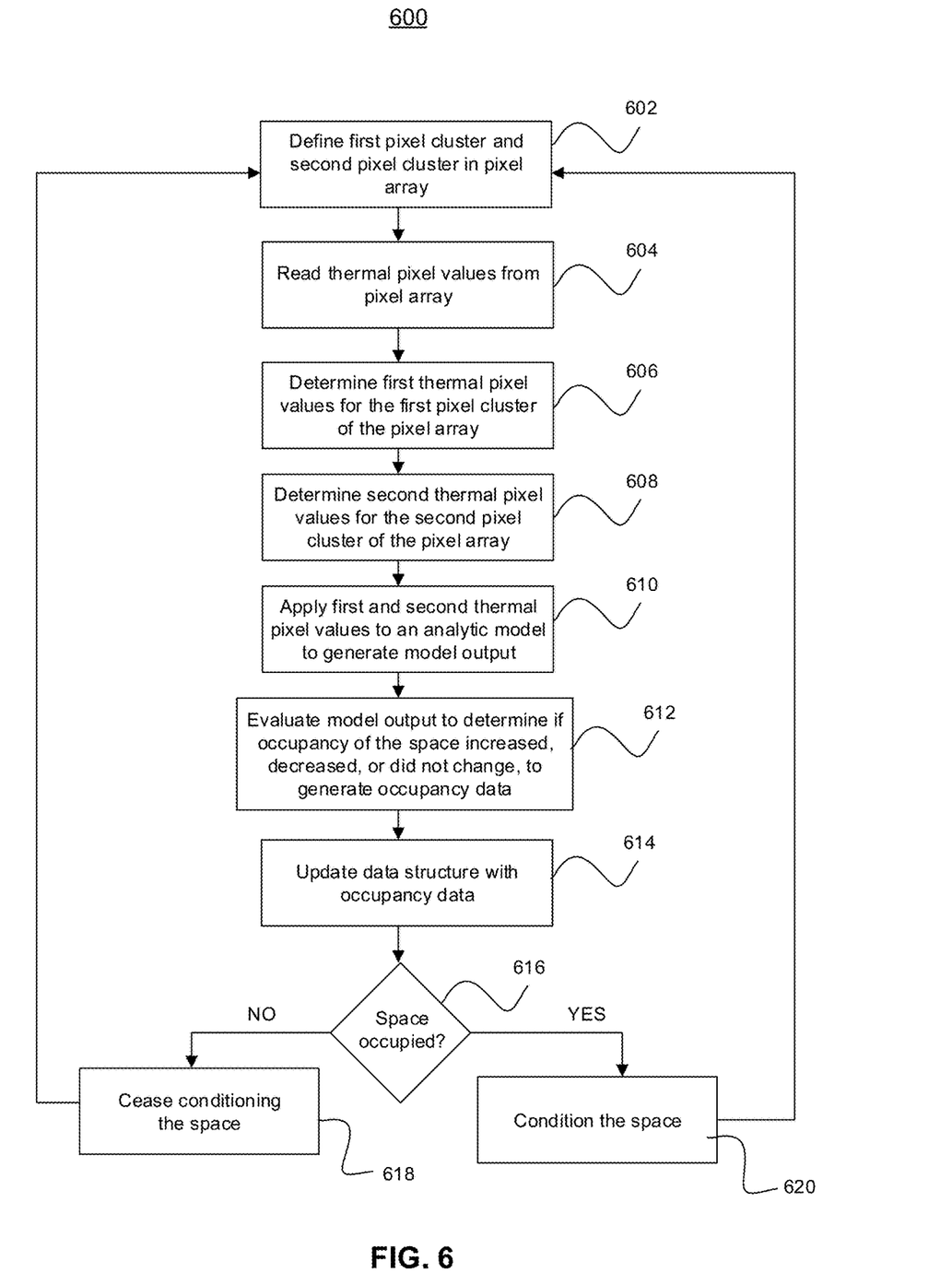
FIG. 6 is another flowchart illustrating a method of occupancy monitoring in accordance with the present disclosure.

FIG. 6 is a flow chart illustrating a method 600 of occupancy monitoring in accordance with the present disclosure. The illustrated flow chart may be shown and described as including a particular sequence of operations. It is to be understood, however, that the sequence of operations merely provides an example of how the general functionality described herein can be implemented. The operations do not have to be executed in the order presented unless otherwise indicated. The method 600 may be performed by the occupancy monitoring system 102 in FIG. 1 that includes a thermal sensor with a pixel array.

At operation 602, the method 600 includes defining at least a first pixel cluster and a second pixel cluster in a pixel array, according to one embodiment. Defining pixel clusters are described in more detail with reference to FIG. 3. In general, any number of pixel clusters may be defined for a given pixel array.

At operation 604, the method 600 includes reading thermal pixel values from a pixel array, according to one embodiment.

At operation 606, the method 600 includes determining first thermal pixel values for the first pixel cluster of the pixel array, according to one embodiment. The first thermal pixel values for the first pixel cluster of the pixel array may be determined by a sum, an average, a flux, a flux velocity, a centroid, and/or a centroid velocity of the first thermal pixel values for the first pixel cluster.

At operation 608, the method 600 includes determining second thermal pixel values for the second pixel cluster of the pixel array, according to one embodiment. The second thermal pixel values for the second pixel cluster of the pixel array may be determined by a sum, an average, a flux, a flux velocity, a centroid, and/or a centroid velocity of the second thermal pixel values for the second pixel cluster.

At operation 610, the method 600 includes applying the first and second thermal pixel values to an analytic model to generate model output, according to one embodiment. Analytic models are discussed in more detail with reference to FIG. 7.

At operation 612, the method 600 includes evaluating the model output to determine if occupancy of the space increased, decreased, or did not change, to generate occupancy data, according to one embodiment. Evaluating analytic models are discussed in more detail with reference to FIG. 7.

At operation 614, the method 600 includes updating the data structure with the occupancy data, according to one embodiment.

At operation 616, the method 600 determines whether the space is occupied, according to one embodiment. If the space is unoccupied, operation 616 proceeds to operation 618, according to one embodiment. If the space is occupied, operation 616 proceeds to operation 620, according to one embodiment.

At operation 618, the method 600 includes ceasing conditioning of the space, according to one embodiment. For example, if no occupancy is detected, the lights in the space may all be turned off and other environmental controls may be set to a default level (e.g., default temperature when the space is not occupied). Operation 618 proceeds to operation 602, in which the method 600 repeats, according to one embodiment.

At operation 620, the method 600 includes conditioning the space, according to one embodiment. Conditioning the space may include, for example, controlling the lights, HVAC system, or other environmental systems based on the detected occupancy of the space. Operation 620 proceeds to operation 602, in which the method 600 repeats, according to one embodiment.

Figure 7:
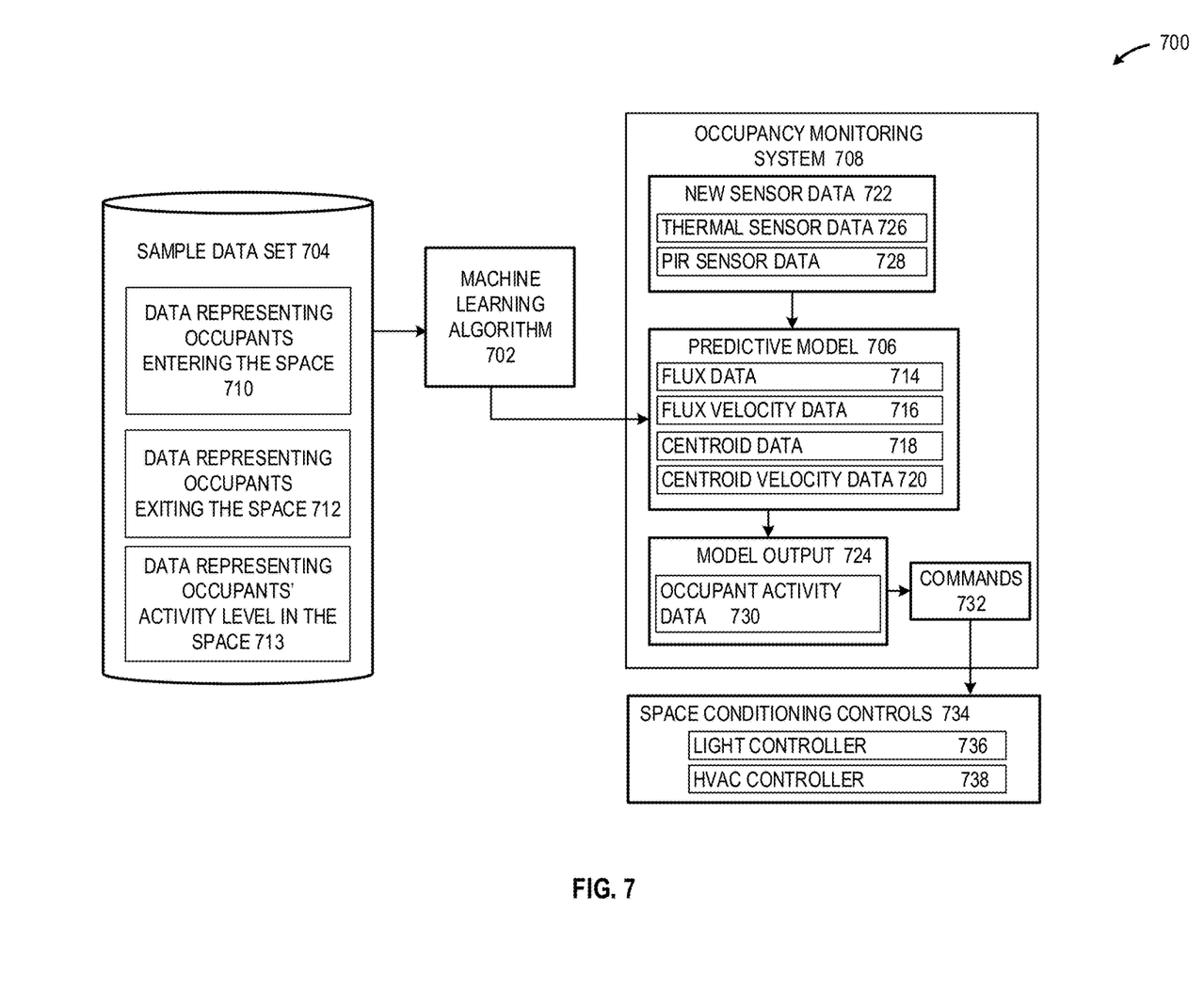
FIG. 7 is a block diagram of an example embodiment of a system in accordance with the present disclosure.

FIG. 7 is an illustrative block diagram of a system 700 in accordance with the present disclosure. The system 700 is an example implementation of a system 100 (shown in FIG. 1), according to one embodiment. The system 700 is configured to employ machine learning to facilitate the detection of occupancy and/or activity of a space (e.g., the space 104 shown in FIG. 1), according to one embodiment. The system 700 includes a machine learning algorithm 702 that is applied to a sample data set 704 to generate a predictive model 706 (synonymously referred to as an analytic model) that may be used by an occupancy monitoring system 708, according to one embodiment.

Machine learning algorithm 702 may include one or more of a variety of techniques used to train predictive models, e.g., the predictive model 706. The machine learning algorithm 702 may include, but is not limited to, one or more of a classification algorithm, a clustering algorithm, or a regression algorithm.

The machine learning algorithm 702 is applied to the sample data set 704 to generate the predictive model 706, according to one embodiment. The sample data set 704 may include data representing occupants entering the space 710, data representing occupants exiting the space 712, and data representing occupants' activity level in the space 713, according to one embodiment. The data representing occupants entering the space 710 may include sensor data collected from a pixel array of a thermal sensor from various types of occupants (e.g., tall, short, male, female, etc.) entering a space through the gate at various speeds (e.g., slow, fast, with a pause, etc.), according to one embodiment. The data representing occupants entering the space 710 may include a sum, an average, a centroid, a centroid velocity, a thermal flux, a thermal flux velocity, or one or more other mathematical calculations applied to pixel values of pixels in a first pixel cluster and a second pixel cluster (e.g., the first pixel cluster 306 and the second pixel cluster 308 shown in FIG. 3) of a pixel array of a thermal sensor, according to one embodiment. The data representing occupants exiting the space 712 may include sensor data collected from a pixel array of a thermal sensor from various types of occupants exiting the space through the gate at various speeds, according to one embodiment. The data representing occupants exiting the space 712 may include a sum, an average, a centroid, a centroid velocity, a thermal flux, a thermal flux velocity, or one or more other mathematical calculations applied to pixel values of pixels in a first pixel cluster and a second pixel cluster of the pixel array of a thermal sensor, according to one embodiment. The data representing occupants' activity level in the space 713 may include sensor data collected from one or more PIR sensors monitoring a space with occupants having various activity levels (e.g., motionless, sedentary but not motionless, walking, moving, dancing, etc.), according to one embodiment.

The predictive model 706 may include relationships between sensor data and occupant activities, according to one embodiment. For example, the predictive model 706 may include flux data 714, flux velocity data 716, centroid data 718, and centroid velocity data 720 that is associated with occupants entering a space, occupants exiting a space, and/or various levels of occupant activity within the space, according to one embodiment. Calculating the flux data 714, flux velocity data 716, centroid data 718, and centroid velocity data 720 is described in more detail with reference to FIG. 3. The predictive model 706 may also include PIR sensor data that is associated with various levels of activity in a space.

The occupancy monitoring system 708 is configured to apply new sensor data 722 to the predictive model 706 to generate model output 724 that is representative of occupant activity in a space, according to one embodiment. The new sensor data 722 may include thermal sensor data 726 and PIR sensor data 728, according to one embodiment. The new sensor data 722 may be acquired from one or more thermal sensors and one or more PIR sensors, according to one embodiment. The model output 724 may include occupant activity data 730, which is representative of occupants in the space, no occupants in the space, and/or a level of activity (e.g., on a scale of 1 to 10) of occupants that are in the space, according to one embodiment.

The occupancy monitoring system 708 may use the occupant activity data 730 to send one or more commands 732 to one or more space (or environment) conditioning controls 734 in order to condition (e.g., heat, cool, maintain temperature, increase light, decrease light, maintain lighting, etc.) a space at least partially based on the new sensor data 722, according to one embodiment. The space conditioning controls 734 may include, but are not limited to, a light controller 736 and an HVAC controller 738, according to one embodiment.

According to one aspect of the disclosure, there is provided an occupancy monitoring system. The occupancy monitoring system may include a thermal sensor to monitor occupant traffic through a gate to a space, the thermal sensor including a pixel array having a plurality of pixels, in which the pixel array includes a first cluster of the plurality of pixels associated with a first region of a field of view for the thermal sensor and the pixel array includes a second cluster of the plurality of pixels associated with a second region of the field of view for the thermal sensor, a memory configured to store first pixel values of the first cluster and second pixel values of the second cluster, and a processor coupled to the thermal sensor and to the memory and configured to determine whether there is a change in occupancy of the space based on changes to the first pixel values and the second pixel values over time.

In some embodiments, the first pixel values represent heat detected by the first cluster within the first region of the field of view for the thermal sensor and the second pixel values represent heat detected by the second cluster within the second region of the field of view for the thermal sensor. In some embodiments, determining whether there is a change in occupancy of the space includes comparing the first pixel values to a threshold to detect a presence of an occupant in the first region of the field of view for the thermal sensor, and comparing the second pixel values to the threshold to detect a presence of an occupant in the second region of the field of view for the thermal sensor. In some embodiments, determining whether there is a change in occupancy of the space includes determining that an occupant enters the space if the second pixel values increment above a threshold after the first pixel values increment above the threshold, and determining that an occupant exits the space if the first pixel values increment above the threshold after the second pixel values increment above the threshold. In some embodiments, determining whether there is a change in occupancy of the space includes applying the first pixel values and the second pixel values to an analytic model to generate occupant activity data representative of the occupancy of the space, in which the occupancy of the space is a number of occupants within the space. In some embodiments, the processor is further configured to increment an occupancy counter if an occupant enters the space and decrement an occupancy counter if an occupant exits with space. In some embodiments, the processor is further configured to transmit commands to control environmental conditions within the space at least partially based on the determined change in occupancy of the space. In some embodiments, environmental conditions of the space include light output in the space and temperature of the space. In some embodiments, the system further includes a light controller configured to control a light output of lights in the space, and the processor is further configured to transmit the commands to the light controller to control the light output in the space. In some embodiments, the system further includes a heating, ventilation, and air conditioning controller (HVAC) configured to control temperature in the space, and the processor is further configured to transmit the commands to the HVAC to control the temperature of the space. In some embodiments, the system further includes at least one passive infrared sensor directed toward the space to monitor a level of activity of occupants in the space, in which the processor is further configured to transmit commands to control environmental conditions of the space at least partially based on the level of activity of occupants in the space. In some embodiments, the processor is further configured to control a security system and/or control access to the space at least partially based on the determined change in occupancy of the space.

According to one aspect of the disclosure, there is provided a method for monitoring a space. The method may include acquiring thermal sensor data from a thermal sensor having a field of view of a gate to a space, the thermal sensor data including pixel values for a plurality of pixels of a pixel array of the thermal sensor, determining first occupancy within a first region of the field of view of the thermal sensor at least partially based on pixel values of a first cluster of the plurality of pixels of the pixel array, determining second occupancy within a second region of the field of view of the thermal sensor at least partially based on pixel values of a second cluster of the plurality of pixels of the pixel array, determining a change in occupancy of the space at least partially based on the changes to the first occupancy within the first region and the second occupancy within the second region over time, and storing, in memory, a number representative of occupancy of the space.

In some embodiments, the method further includes transmitting commands to control environmental conditions of the space based on the number representative of the occupancy of the space. In some embodiments, the environmental conditions include light output within the space and temperature of the space. In some embodiments, the method further includes controlling one or more of access to the space or a security system for the space at least partially based on the number representative of the occupancy of the space. In some embodiments, determining the first occupancy includes one or more of comparing a sum of the pixel values of the first cluster of the plurality of pixels of the pixel array to a threshold, comparing an average of the pixel values of the first cluster of the plurality of pixels of the pixel array to the threshold, or comparing a centroid of the pixel values of the first cluster of the plurality of pixels of the pixel array to the threshold. In some embodiments, determining the second occupancy includes one or more of comparing a sum of the pixel values of the second cluster of the plurality of pixels of the pixel array to a threshold, comparing an average of the pixel values of the second cluster of the plurality of pixels of the pixel array to the threshold, or comparing a centroid of the pixel values of the second cluster of the plurality of pixels of the pixel array to the threshold. In some embodiments, determining a change in occupancy of the space includes applying the pixel values of the first cluster and the pixel values of the second cluster to a predictive model to generate an model output, comparing the model output to a threshold, updating the number representative of occupancy of the space based on the comparison of the model output to a threshold. In some embodiments, the method further includes applying machine learning to train the analytic model to determine when there is a change in occupancy of space at least partially based on the first occupancy within the first region and the second occupancy within the second region.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection.

As used in any embodiment herein, a "circuit" or "circuitry" may include, for example, singly or in any combination, hardwired circuitry, programmable circuitry, state machine circuitry, and/or firmware that stores instructions executed by programmable circuitry. In at least one embodiment, the occupancy monitoring system 102 may include one or more integrated circuits. An "integrated circuit" may be a digital, analog or mixed-signal semiconductor device and/or microelectronic device, such as, for example, but not limited to, a semiconductor integrated circuit chip.

Embodiments of the methods described herein may be implemented using a processor and/or other programmable device. To that end, the methods described herein may be implemented on a tangible, non-transitory computer readable medium having instructions stored thereon that when executed by one or more processors perform the methods. Thus, for example, the occupancy monitoring system 102 may include a storage medium (not shown) to store instructions (in, for example, firmware or software) to perform the operations described herein. The storage medium may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

It will be appreciated by those skilled in the art that any block diagrams herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

While the principles of the embodiments have been described herein, it is to be understood by those skilled in the art that this description is made only by way of example and not as a limitation as to the scope of the application. Other embodiments are contemplated within the scope of the present invention in addition to the exemplary embodiments shown and described herein. Modifications and substitutions by one of ordinary skill in the art are considered to be within the scope of the present application, which is not to be limited except by the following claims.

What is claimed is:

1. An occupancy monitoring system, comprising:
 a thermal sensor to monitor occupant traffic through a gate to a space, the thermal sensor comprising a pixel array having a plurality of pixels, wherein:
  the pixel array includes a first cluster of the plurality of pixels associated with a first region of a field of view for the thermal sensor; and
  the pixel array includes a second cluster of the plurality of pixels associated with a second region of the field of view for the thermal sensor;
 a memory configured to store first pixel values of the first cluster and second pixel values of the second cluster; and
 a processor coupled to the thermal sensor and to the memory and configured to:
  determine whether there is a change in occupancy of the space based on changes to the first pixel values and the second pixel values over time by:
   applying the first pixel values and the second pixel values to a predictive model to generate a model output;
   comparing the model output to a threshold; and
   updating a number representative of occupancy of the space based on the comparison of the model output to the threshold.

2. The occupancy monitoring system of claim 1, wherein the first pixel values represent heat detected by the first cluster within the first region of the field of view for the thermal sensor and the second pixel values represent heat detected by the second cluster within the second region of the field of view for the thermal sensor.

3. The occupancy monitoring system of claim 1, wherein determining whether there is a change in occupancy of the space comprises:
 comparing the first pixel values to a threshold to detect a presence of an occupant in the first region of the field of view for the thermal sensor; and
 comparing the second pixel values to the threshold to detect a presence of an occupant in the second region of the field of view for the thermal sensor.

4. The occupancy monitoring system of claim 1, wherein determining whether there is a change in occupancy of the space comprises:
 determining that an occupant enters the space if the second pixel values increment above a threshold after the first pixel values increment above the threshold; and
 determining that an occupant exits the space if the first pixel values increment above the threshold after the second pixel values increment above the threshold.

5. The occupancy monitoring system of claim 1, wherein determining whether there is a change in occupancy of the space further comprises:
 applying machine learning to train the predictive model to determine when there is a change in occupancy of space at least partially based on occupancy within the first region and occupancy within the second region.

6. The occupancy monitoring system of claim 1, wherein the processor is further configured to:
 increment an occupancy counter if an occupant enters the space; and
 decrement an occupancy counter if an occupant exits with space.

7. The occupancy monitoring system of claim 1, wherein the processor is further configured to:
 transmit commands to control environmental conditions within the space at least partially based on the determined change in occupancy of the space.

8. The occupancy monitoring system of claim 7, wherein environmental conditions of the space include light output in the space and temperature of the space.

9. The occupancy monitoring system of claim 7, wherein:
 the system further comprises a light controller configured to control a light output of lights in the space; and
 the processor is further configured to transmit the commands to the light controller to control the light output in the space.

10. The occupancy monitoring system of claim 7, wherein:
 the system further comprises a heating, ventilation, and air conditioning controller (HVAC) configured to control temperature in the space; and
 the processor is further configured to transmit the commands to the HVAC to control the temperature of the space.

11. The occupancy monitoring system of claim 1, wherein:
 the system further comprises at least one passive infrared sensor directed toward the space to monitor a level of activity of occupants in the space; and
 the processor is further configured to transmit commands to control environmental conditions of the space at least partially based on the level of activity of occupants in the space.

12. The occupancy monitoring system of claim 1, wherein the processor is further configured to:
 control a security system and/or control access to the space at least partially based on the determined change in occupancy of the space.

13. A method of monitoring a space, comprising:
 acquiring thermal sensor data from a thermal sensor having a field of view of a gate to a space, the thermal sensor data including pixel values for a plurality of pixels of a pixel array of the thermal sensor;
 determining first occupancy within a first region of the field of view of the thermal sensor at least partially based on pixel values of a first cluster of the plurality of pixels of the pixel array;
 determining second occupancy within a second region of the field of view of the thermal sensor at least partially based on pixel values of a second cluster of the plurality of pixels of the pixel array;
 determining a change in occupancy of the space at least partially based on the changes to the first occupancy within the first region and the second occupancy within the second region over time by:
  applying the pixel values of the first cluster and the pixel values of the second cluster to a predictive model to generate a model output;
  comparing the model output to a threshold; and
  updating the number representative of occupancy of the space based on the comparison of the model output to the threshold; and
 storing, in memory, a number representative of occupancy of the space.

14. The method of claim 13, further comprising:
transmitting commands to control environmental conditions of the space based on the number representative of the occupancy of the space.

15. The method of claim 14, wherein the environmental conditions include light output within the space and temperature of the space.

16. The method of claim 13, further comprising:
controlling one or more of access to the space or a security system for the space at least partially based on the number representative of the occupancy of the space.

17. The method of claim 13, wherein determining the first occupancy includes one or more of:
comparing a sum of the pixel values of the first cluster of the plurality of pixels of the pixel array to a threshold;
comparing an average of the pixel values of the first cluster of the plurality of pixels of the pixel array to the threshold; or
comparing a centroid of the pixel values of the first cluster of the plurality of pixels of the pixel array to the threshold.

18. The method of claim 13, wherein determining the second occupancy includes one or more of:
comparing a sum of the pixel values of the second cluster of the plurality of pixels of the pixel array to a threshold;
comparing an average of the pixel values of the second cluster of the plurality of pixels of the pixel array to the threshold; or
comparing a centroid of the pixel values of the second cluster of the plurality of pixels of the pixel array to the threshold.

19. The method of claim 13, further comprising:
applying machine learning to train the predictive model to determine when there is a change in occupancy of space at least partially based on the first occupancy within the first region and the second occupancy within the second region.

* * * * *